(No Model.) 2 Sheets—Sheet 1.

S. WHITLOCK.
REVERSING MECHANISM.

No. 362,344. Patented May 3, 1887.

Witnesses:
J. N. Shumway
Fred C. Earle

Sturges Whitlock, Inventor
By atty.

UNITED STATES PATENT OFFICE.

STURGES WHITLOCK, OF BIRMINGHAM, CONNECTICUT.

REVERSING MECHANISM.

SPECIFICATION forming part of Letters Patent No. 362,344, dated May 3, 1887.

Application filed February 14, 1887. Serial No. 227,522. (No model.)

*To all whom it may concern:*

Be it known that I, STURGES WHITLOCK, of Birmingham, in the county of New Haven and State of Connecticut, have invented a new Improvement in Machinery-Reversing Mechanism; and I do hereby declare the following, when taken in connection with accompanying drawings and the letters of reference marked thereon, to be a full, clear, and exact description of the same, and which said drawings constitute part of this specification, and represent, in—

Figure 1:
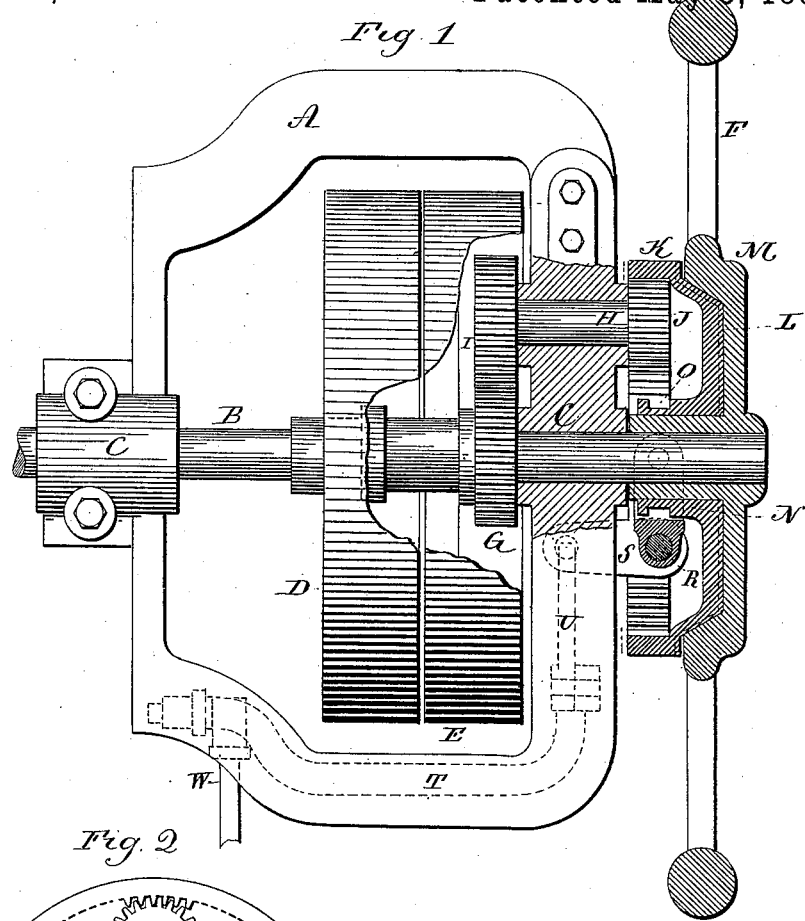
Figure 2:
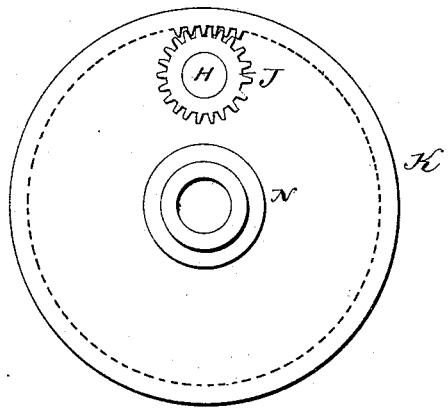

Figure 1, a sectional top or plan view; Fig. 2, an inside view of the gear K, showing the pinion J as working therein; Fig. 3, a front end view, parts broken away to show the clutch-lever.

This invention relates to an improvement in mechanism used in combination with a fixed and loose pulley adapted for the band to run upon either one or the other, and whereby, while the fixed pulley is used for applying the power to the machine for direct action, the loose pulley may be employed when required to impart a reverse movement, such mechanism being especially adapted to printing-presses, to enable the operator to run the press backward when occasion requires.

The object of my invention is to produce a simple and easily-adjustable mechanism for imparting such rear movement.

In illustrating my invention I do not show the machine to which it may be applied, that not being essential to the full understanding of the invention.

A represents a frame or bracket, which is understood to be a part of the frame of the machine; B, the driving-shaft, or shaft through which power is communicated to the machine. This shaft is supported in suitable bearings, C C, and carries a pulley, D, fixed to the shaft, and through which revolution is imparted directly to the shaft B. This shaft also carries a loose pulley, E, arranged in relation to the fixed pulley D, in the usual manner for tight and loose pulleys.

F is the fly-wheel, which is fixed to the outer end of the shaft.

On the hub of the loose pulley E a toothed pinion, G, is fixed, so as to partake of the revolution of the pulley E.

Parallel with the shaft B a second shaft, H, is arranged in suitable bearings, extending into the loose pulley E and carrying a gear, I, upon its inner end, corresponding to the pinion G, and so that the said pinion G and gear I will work together, that the revolution of the pinion G may be communicated to the shaft H. On the opposite end of the shaft H a pinion, J, is fixed. Loose upon the shaft B, outside the pinion G, an internal gear-wheel, K, is arranged, its internal teeth corresponding to the pinion J, and so that the revolution of the pinion J will be imparted to the internal gear, K, the said internal gear working loosely on the shaft B, or on the hub of the fly-wheel, which is the same thing.

The outer side of the internal gear, K, projects outward, forming a frustum-of-cone shape, L, and the hub M of the fly-wheel is correspondingly recessed upon its inner side, so that the projection L of the internal gear, K, will stand within the said recess. The gear K is movable longitudinally on the driving-shaft or hub of the fly-wheel to such an extent that the conical surface of the projection L may be brought into close contact with the corresponding surface of the fly-wheel, as seen in Fig. 1, or withdrawn therefrom, as seen in broken lines. This arrangement of the gear K and its projection L with the corresponding surface of the fly-wheel acts as a common friction-clutch, so that when the wheel and gear are engaged in frictional contact the revolution of the gear K will be imparted to the fly-wheel, or when the gear K is withdrawn from the fly-wheel then the fly-wheel will be free and independent of the revolution of the gear K.

The hub N of the gear K is constructed with an annular groove, O, into which the forked arm P of a lever, hung upon a fulcrum, R, works. From the fulcrum R a second arm, S, extends, and by which the fork may be thrown outward or inward to correspondingly move the gear K and its projection L, and force it into frictional contact with the fly-wheel, or withdraw it therefrom, as the case may be.

To illustrate the operation of the invention, suppose the band to be on the fixed pulley D and the machine running in the usual manner, and what may be called the "advance" direction, and that the gear K with its projection L are withdrawn from the hub M, so as to prevent engagement. In this condition the machine runs as in ordinary work, and if the band be thrown onto the loose pulley E that pulley will revolve loosely on the shaft and permit the machine to stop. Now, while the band is driving the loose pulley and the machine at rest, the pinion G on the hub of the loose pulley will impart revolution to the shaft H and to the gear K and projection L, (which may properly be called the "clutch;") but because of the disengagement of the clutch from the hub M the loose pulley runs without effect upon the machine. The clutch, because of the gearing, runs in the opposite direction to the pulley. If now it be desired to run the machine backward, the backwardly-revolving clutch is thrown into engagement with the hub M, and the power of the band through the pulley E is applied to the fly-wheel to give to it the backward direction of the clutch, and when a sufficient extent of backward movement has been produced the clutch is withdrawn. Under this arrangement the gear portion of the mechanism always remains in engagement, revolving only with the loose pulley; and because of the natural friction between the gearing the loose pulley will generally remain stationary while the machine is working, the driving-shaft B revolving loosely in the loose pulley and in the clutch; and the clutch mechanism being of the simplest possible character, the wear of this reverse mechanism is very little, but yet is always ready for easy application.

While specially adapted for printing-machines, this reversing mechanism may be employed in various classes of machine where fixed and loose pulleys are employed and a reverse movement is at times desirable.

From the clutch fork or lever P connections may be made to any point where it may be desirable, so that the reverse movement may be conveniently brought into operation. This extension of the mechanism may be through a rock-shaft, T, and connecting-rods U and W, but such connections will readily suggest themselves to those skilled in the art to which this invention is applicable.

While I prefer to employ a frictional clutch to make the engagement, it will be evident to those skilled in the art that other known clutching mechanism may be substituted, such other clutching mechanism being too well known to require illustration or description.

The hub M, or part of the clutch which is fixed to the shaft, is not of necessity a part of the fly-wheel, though I find it convenient to so represent it in thus illustrating the invention as applicable to a printing-machine, as the shaft in such cases is provided with a flywheel.

I claim—

1. The combination of a driving-shaft, a pulley fixed thereon, a corresponding pulley loose on the shaft, said loose pulley carrying a pinion, a shaft parallel with the driving-shaft, a gear upon one end of said second shaft working into the pinion on the loose pulley, the said second shaft also carrying a pinion upon its other end, a gear loose upon the shaft both circumferentially and longitudinally and working into the said pinion on the said second shaft, the said loose gear forming part of a clutch, and the corresponding part of the clutch formed as a hub fixed to the shaft, and with which said gear part of the clutch is adapted to engage or disengage, substantially as and for the purpose described.

2. The combination of the driving-shaft B, pulley D, fixed thereon, a corresponding pulley, E, loose on said shaft, a pinion, G, fixed on said loose pulley, a shaft, H, parallel with the driving-shaft, gear I, on one end of said shaft H, working into the pinion G of the loose pulley, a pinion, J, fixed to said shaft H, an internal gear, K, loose upon said shaft both circumferentially and longitudinally and corresponding to said pinion J, the said gear K constructed with a projection, L, and the hub fixed to the said shaft B, having a surface corresponding to the said projection L, and with which said projection is adapted to engage, substantially as described.

STURGES WHITLOCK.

Witnesses:
  FRED C. EARLE,
  J. H. SHUMWAY.